United States Patent
Kawahara

(10) Patent No.: US 11,853,060 B2
(45) Date of Patent: Dec. 26, 2023

(54) VEHICLE CONTROL SYSTEM

(71) Applicant: TOYOTA JIDOSHA KABUSHIKI KAISHA, Toyota (JP)

(72) Inventor: Satoshi Kawahara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 232 days.

(21) Appl. No.: 17/192,969

(22) Filed: Mar. 5, 2021

(65) Prior Publication Data

US 2021/0341919 A1  Nov. 4, 2021

(30) Foreign Application Priority Data

Apr. 30, 2020 (JP) ................................. 2020-080706

(51) Int. Cl.
*B60W 50/029* (2012.01)
*G05D 1/00* (2006.01)
*B60W 50/02* (2012.01)
*G05D 1/02* (2020.01)

(52) U.S. Cl.
CPC ....... *G05D 1/0088* (2013.01); *B60W 50/0205* (2013.01); *B60W 50/029* (2013.01); *G05D 1/0231* (2013.01); *B60W 2420/52* (2013.01)

(58) Field of Classification Search
CPC .............. G05D 1/0088; G05D 1/0231; B60W 50/0205; B60W 50/029; B60W 2420/52
See application file for complete search history.

(56) References Cited

U.S. PATENT DOCUMENTS

| | | | |
|---|---|---|---|
| 9,494,940 B1* | 11/2016 | Kentley | B60W 10/20 |
| 2018/0046183 A1* | 2/2018 | Peters | G05D 1/0088 |
| 2019/0138408 A1* | 5/2019 | Menon | G06F 11/27 |
| 2019/0359221 A1* | 11/2019 | Ochida | B60W 60/00 |

FOREIGN PATENT DOCUMENTS

| | | |
|---|---|---|
| CN | 110300691 A | 10/2019 |
| WO | WO 2018/154860 A1 | 8/2018 |
| WO | WO 2019/116870 A1 | 6/2019 |

* cited by examiner

*Primary Examiner* — Hunter B Lonsberry
*Assistant Examiner* — Matthew J. Reda
(74) *Attorney, Agent, or Firm* — Oblon, McClelland, Maier & Neustadt, L.L.P.

(57) ABSTRACT

A vehicle control system includes a memory, a processor connected to the memory, and a functional section. The functional section is configured by a first device and a second device having equivalent functionality to each other, and the functional section is connected in a communicable manner to the processor which serves as a driving assistance control section configured to perform driving assistance including at least braking control of a vehicle, and services as an autonomous driving control section configured to perform autonomous driving of the vehicle. The processor is configured to use the first device at least during execution of driving assistance of the vehicle, and to use the second device at least during execution of autonomous driving of the vehicle.

5 Claims, 6 Drawing Sheets

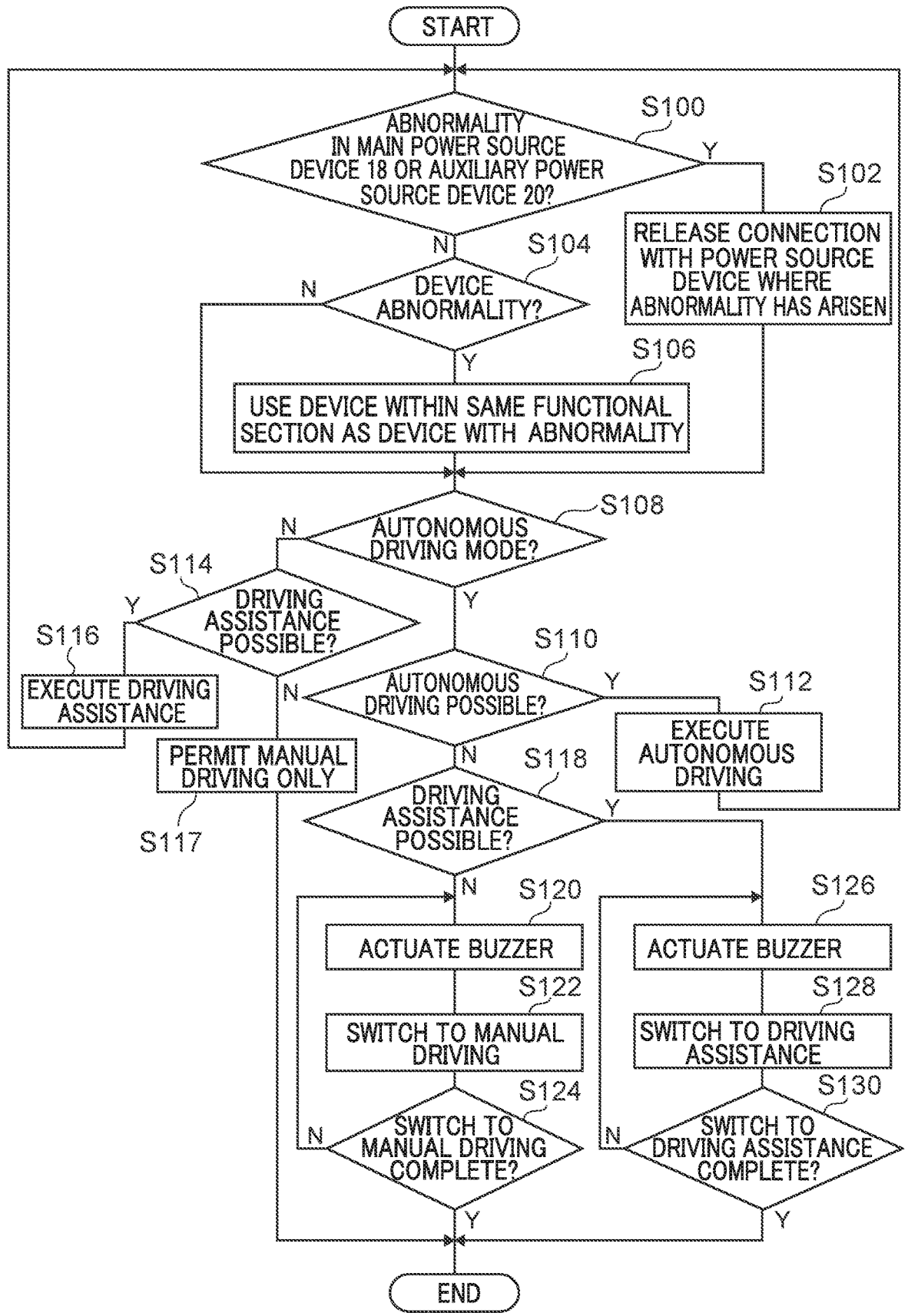

VEHICLE CONTROL SYSTEM

CROSS-REFERENCE TO RELATED APPLICATION

This application is based on and claims priority under 35 USC 119 from Japanese Patent Application No. 2020-080706 filed on Apr. 30, 2020, the disclosure of which is incorporated by reference herein.

BACKGROUND

Technical Field

The present disclosure relates to a vehicle control system.

International Publication (WO) No. 2018/154860 discloses an example of technology relating to a vehicle control system. This vehicle control system includes an autonomous driving control device to execute autonomous driving of a vehicle, and a driving assistance control device to execute driving assistance during manual driving of the vehicle.

Providing redundant structures may be considered as a way of dealing with situations in which the autonomous driving control device disclosed in WO No. 2018/154860 or devices including various sensors, braking mechanisms, and the like required for autonomous driving break down or otherwise stop functioning. However, providing redundant structures increases the number of components. Since this results in accompanying increases in weight, installation space requirements, and power consumption, there is room for improvement regarding this point in the related art described above.

SUMMARY

The present disclosure obtains a vehicle control system capable of suppressing an increase in the number of components in redundant structures.

A vehicle control system of a first aspect includes a driving assistance control section configured to perform driving assistance including at least braking control of a vehicle, an autonomous driving control section configured to perform autonomous driving of the vehicle, a first device used at least during execution of driving assistance of the vehicle, a second device used at least during execution of autonomous driving of the vehicle, and a functional section configured by the first device and the second device having equivalent functionality to each other, and connected in a communicable manner to the driving assistance control section and to the autonomous driving control section.

In the first aspect, the vehicle control system includes the driving assistance control section, the autonomous driving control section, the first device, the second device, and the functional section. The driving assistance control section performs driving assistance including at least braking control of the vehicle. The autonomous driving control section controls so as to perform autonomous driving of the vehicle. The first device is used at least during execution of driving assistance of the vehicle. The second device is used at least during execution of autonomous driving of the vehicle. The functional section is configured by the first device and the second device having equivalent functionality to each other, and is connected in a communicable manner to the driving assistance control section and to the autonomous driving control section. Note that as an example of the first device and the second device having equivalent functionality to each other, a stereo camera is a first device that has vehicle forward monitoring functionality and is used during execution of driving assistance, while a forward LIDAR is a second device that has vehicle forward monitoring functionality, this being equivalent functionality to the stereo camera, and is used during execution of autonomous driving. In cases in which an abnormality has arisen in either out of the first device or the second device configuring the functional section, the other device out of the first device or the second device configuring the same functional section can be used. This enables autonomous driving or driving assistance of the vehicle to be performed without providing redundant structures for both the device that performs autonomous driving and the device that performs driving assistance.

Note that "equivalent functionality" is not limited to having exactly the same functionality, and also includes cases in which the range, region, or degree at which the functionality is implemented differs slightly.

A vehicle control system of a second aspect is the first aspect, wherein the first device is connected in a communicable manner to the driving assistance control section, the second device is connected in a communicable manner to the autonomous driving control section, and the first device is further connected in a communicable manner to the autonomous driving control section.

In the second aspect, the first device is connected in a communicable manner to the driving assistance control section. The second device is connected in a communicable manner to the autonomous driving control section. The first device is further connected in a communicable manner to the autonomous driving control section. Accordingly, during autonomous driving of the vehicle, the autonomous driving control section communicates not only with the second device but also with the first device used during execution of driving assistance, enabling the first device to be used in autonomous driving. Namely, the first device can act as a backup device for the second device.

A vehicle control system of a third aspect is the second aspect, wherein the second device is further connected in a communicable manner to the driving assistance control section.

In the third aspect, the second device is further connected in a communicable manner to the driving assistance control section. Accordingly, during driving assistance of the vehicle, the driving assistance control section communicates not only with the first device but also with the second device used during execution of autonomous driving, enabling the second device to be used in driving assistance. Namely, the second device can act as a backup device for the first device.

A vehicle control system of a fourth aspect is the second aspect or the third aspect, wherein the autonomous driving control section is configured to communicate with the first device when communication with the second device is abnormal.

In the fourth aspect, when communication with the second device is abnormal, the autonomous driving control section communicates with the first device used during execution of driving assistance, enabling the first device to be used to control the vehicle. Namely, it is possible to prevent an immediate loss of control of the vehicle even in cases in which an abnormality has arisen in the second device during autonomous driving.

Note that "abnormal" not only refers to states in which communication with various devices such as the second device is not possible, but also incorporates states in which the various devices themselves are broken, or power is not being supplied to the various devices.

A vehicle control system of a fifth aspect is any one of the first aspect to the fourth aspect, wherein the driving assistance control section and the first device are supplied with power from a main power source section, and the autonomous driving control section and the second device are supplied with power from an auxiliary power source section.

In the fifth aspect, the driving assistance control section and the first device are supplied with power from the main power source section. The autonomous driving control section and the second device are supplied with power from the auxiliary power source section. Accordingly, even in cases in which an abnormality has arisen in one of the main power source section or the auxiliary power source section, the autonomous driving control section and the second device, or the driving assistance control section and the first device, that use the other out of the main power source section or the auxiliary power source section as a power supply source can be used to control the vehicle.

A vehicle control system of a sixth aspect is any one of the first aspect to the fifth aspect, wherein the main power source section is set with a larger power capacity than the auxiliary power source section.

In the sixth aspect, since the main power source section is set with a larger power capacity than the auxiliary power source section, the size of the auxiliary power source section can be reduced. This enables the required installation space in the vehicle to be reduced in comparison to cases in which the main power source section and the auxiliary power source section are set with the same power capacity as each other.

A vehicle control system of a seventh aspect is any one of the first aspect to the sixth aspect, further including a third device that is only used during execution of autonomous driving of the vehicle, that is connected in a communicable manner to the autonomous driving control section, and that is also connected to the main power source section.

The seventh aspect further includes the third device that is only used during execution of autonomous driving. The third device is connected in a communicable manner to the autonomous driving control section, and is also connected to the main power source section. Namely, since use of the third device is not required in an emergency when autonomous driving cannot generally be performed, for example when an abnormality has arisen, there is less need to provide a redundant structure therefor. The third device is connected to the main power source section, enabling the power supplied by the auxiliary power source section to be further reduced. This therefore enables a further reduction in size of the auxiliary power source section.

A vehicle control system of an eighth aspect is the seventh aspect, wherein the third device is at least one of an occupant monitoring device configured to perform occupant monitoring, a vehicle side LIDAR configured to detect peripheral information to a side of the vehicle, or a vehicle rearward LIDAR configured to detect peripheral information rearward of the vehicle.

In the eighth aspect, the third device is at least one of the occupant monitoring device configured to perform occupant monitoring, the vehicle side LIDAR configured to detect peripheral information to a side of the vehicle, or the vehicle rearward LIDAR configured to detect peripheral information rearward of the vehicle. None of these devices are required to be used in an emergency when autonomous driving cannot generally be performed, for example when an abnormality has arisen. Accordingly, connecting these devices to the main power source section enables the power supplied by the auxiliary power source section to be further reduced.

The vehicle control system of the first aspect has an excellent advantageous effect of suppressing an increase in the number of components in redundant structures.

The vehicle control system of the second aspect has an excellent advantageous effect of enabling redundancy during autonomous driving to be improved.

The vehicle control system of the third aspect has an excellent advantageous effect of enabling redundancy during driving assistance to be improved.

The vehicle control system of the fourth aspect has an excellent advantageous effect of enabling safety during autonomous driving to be improved.

The vehicle control system of the fifth aspect has an excellent advantageous effect of enabling redundancy during autonomous driving and during driving assistance to be improved.

The vehicle control systems of the sixth aspect to the eighth aspect have an excellent advantageous effect of enabling the degrees of freedom for design to be improved.

BRIEF DESCRIPTION OF THE DRAWINGS

Exemplary embodiments of the present invention will be described in detail based on the following figures, wherein:

FIG. 6 is a flowchart illustrating a flow of processing when an abnormality has arisen in a vehicle control system according to an exemplary embodiment.

DETAILED DESCRIPTION

Figure 1:
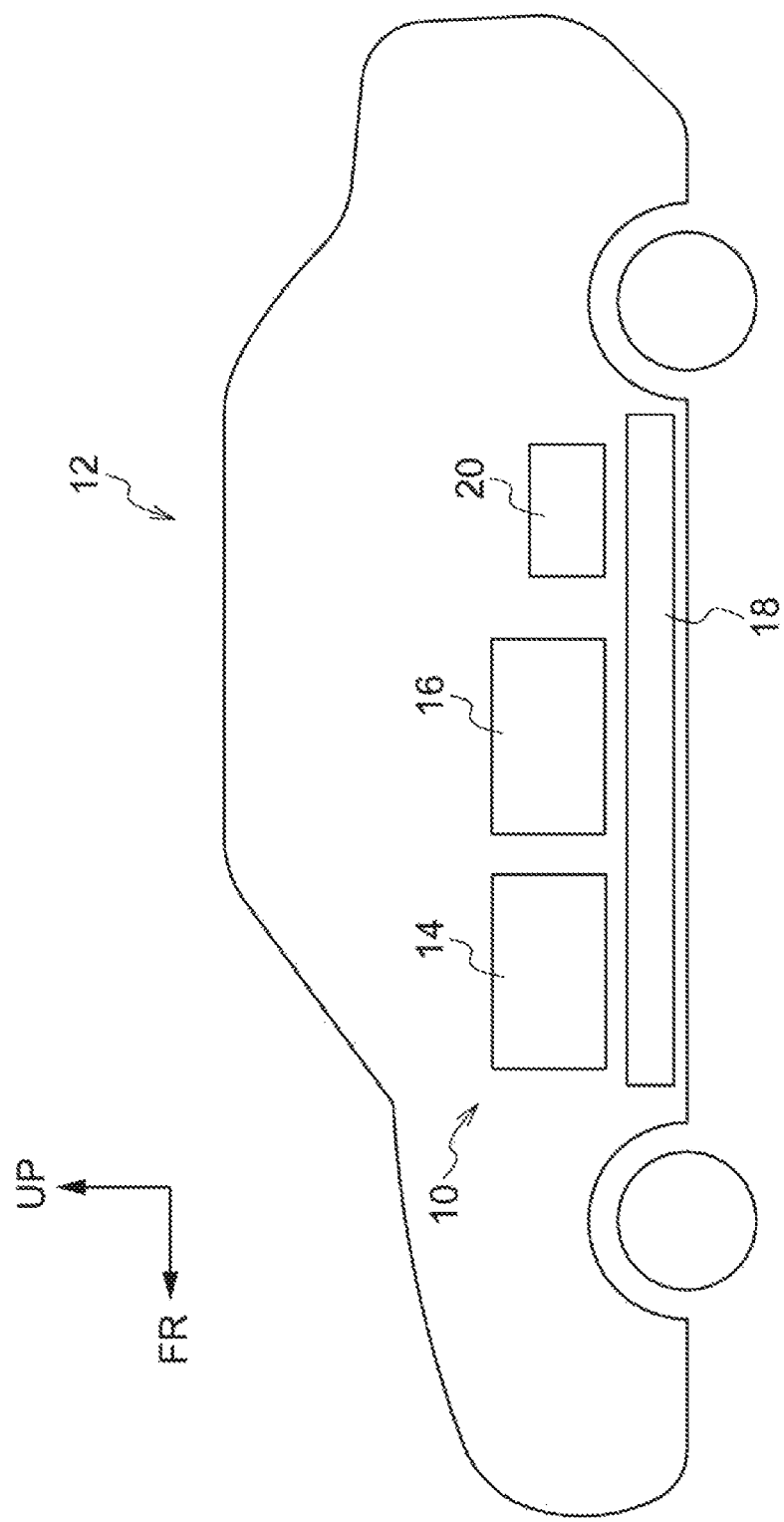
FIG. 1 is a schematic side view illustrating a vehicle including a vehicle control system according to an exemplary embodiment.

Explanation follows regarding a vehicle control system 10 according to an exemplary embodiment, with reference to FIG. 1 to FIG. 6. Note that the arrow FR and the arrow UP in the drawings respectively indicate a forward direction and upward direction of a vehicle, as appropriate. The relative proportions in the drawings may be exaggerated to aid explanation, and may differ from actual proportions.

Overall Configuration

As illustrated in FIG. 1, a vehicle 12 applied with the vehicle control system 10 is, for example, a vehicle installed with a driving assistance system 14, an autonomous driving system 16, a main power source device 18, and an auxiliary power source device 20. The vehicle 12 is capable of being manually driven by an occupant, and of autonomous driving under the control of the autonomous driving system 16. The driving assistance system 14 performs driving assistance during manual driving by an occupant so as to control steering and braking of the vehicle 12 in response to a situation ahead of the vehicle or the like.

Driving Support System

Figure 2:
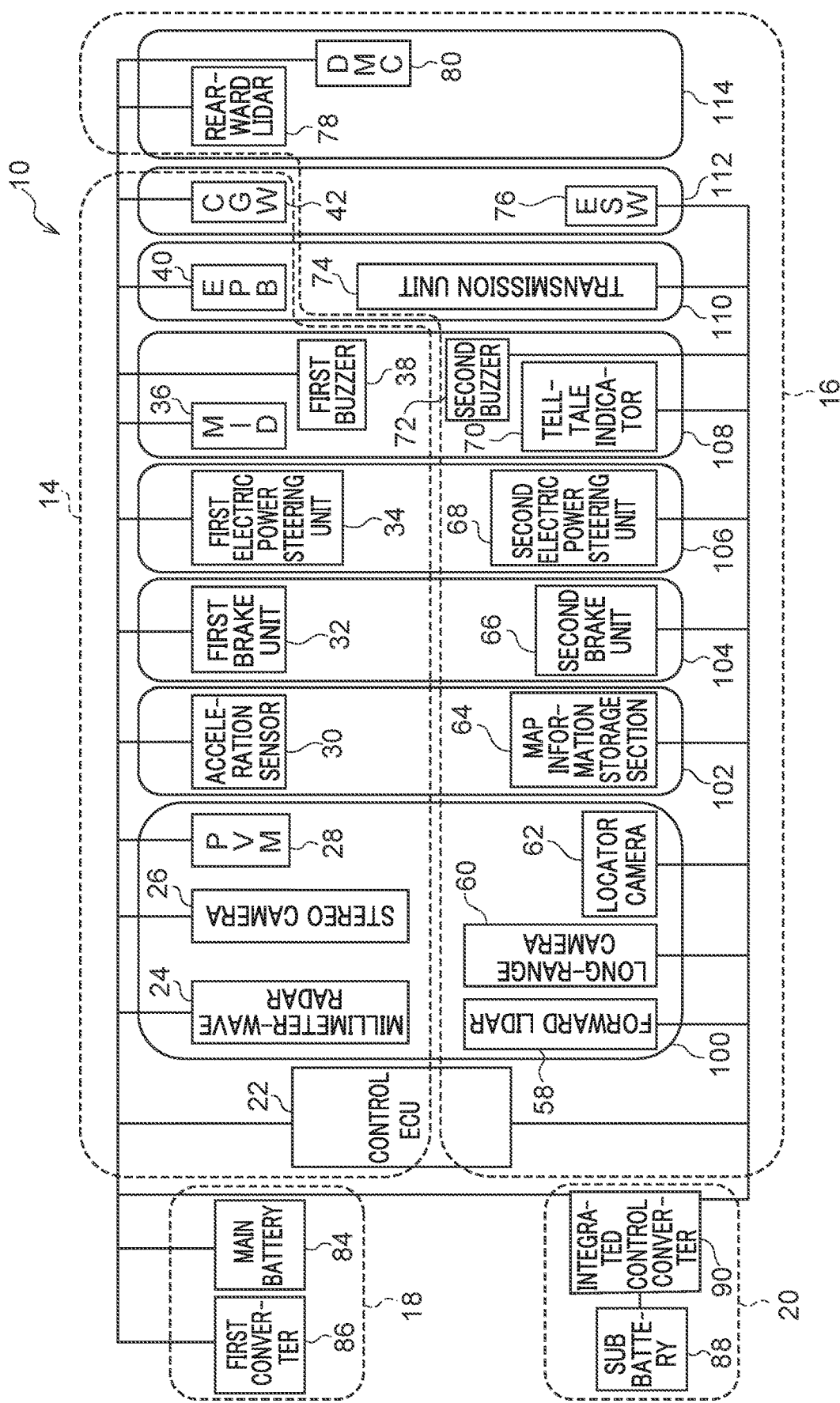
FIG. 2 is a block diagram illustrating hardware configuration of onboard devices in a vehicle control system according to an exemplary embodiment.

As illustrated in FIG. 2, the driving assistance system 14 is configured of plural devices. Specifically, the driving assistance system 14 is configured including a control electrical control unit (ECU) 22, a millimeter-wave radar 24, a stereo camera 26, a panoramic view monitor system (hereafter "PVM") 28, an acceleration sensor 30, a first brake unit 32, a first electric power steering unit 34, a multi information display unit (hereafter "MID") 36, a first buzzer 38, an electric parking brake unit (hereafter "EPB") 40, and a central gateway (hereafter "CGW") 42.

Figure 3:
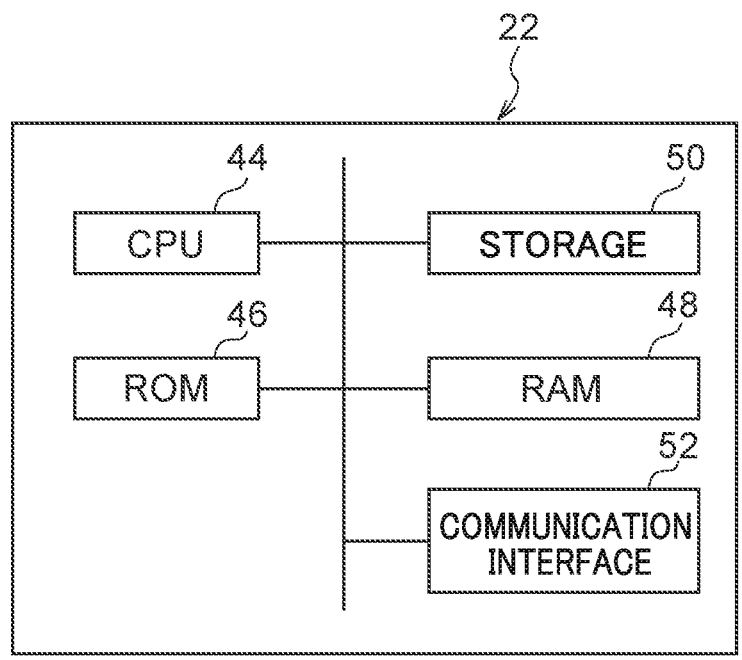
FIG. 3 is a block diagram illustrating hardware configuration of a control ECU in a vehicle control system according to an exemplary embodiment.

As illustrated in FIG. 3, the control ECU 22 is configured including an internal central processing unit (CPU) 44, read only memory (ROM) 46, random access memory (RAM) 48, storage 50, and a communication interface 52. These configurations are connected together through a bus 54 so as to be capable of communicating with each other.

The CPU 44 is a central processing unit serving as a processor, and executes various programs and controls various sections. Namely, the CPU 44 reads a program from the ROM 46, serving as memory, or from the storage 50, likewise serving as memory, and executes the program using the RAM 48 as a workspace. The CPU 44 controls the various configurations and performs various computation processing according to the program recorded in the ROM 46 or the storage 50. In the present exemplary embodiment, the ROM 46 or the storage 50 holds a driving assistance program to implement driving assistance, including assisting steering and controlling braking and drive during manual driving of the vehicle 12 by an occupant.

The ROM 46 holds various programs and various data. The RAM 48 serves as a workspace to temporarily store programs and data. The storage 50 is configured by a hard disk drive (HDD) or a solid state drive (SSD), and holds various programs including an operating system, as well as various data.

The communication interface 52 is an interface used by the control ECU 22 to communicate with other devices, and for example employs a protocol such as Ethernet (registered trademark), CAN, or the like.

As illustrated in FIG. 2, the millimeter-wave radar 24 is a sensor that detects peripheral information relating to the peripheral environment around the vehicle 12. The millimeter-wave radar 24 transmits scanning waves over a predetermined range and receives reflected waves in order to detect a travel path ahead of the vehicle 12, obstacles in the surroundings, and the like.

The stereo camera 26 is a sensor that detects peripheral information relating to the peripheral environment around the vehicle 12. The stereo camera 26 is provided at a cabin inside of an upper portion of a front windshield, not illustrated in the drawings, of the vehicle 12, and acquires image information by capturing the situation outside the vehicle 12. The stereo camera 26 further includes two image capture sections situated so as to simulate parallax, and information relating to a depth direction is thereby included in the acquired image information.

The PVM 28 is a sensor that detects peripheral information relating to the peripheral environment around the vehicle 12. The PVM 28 includes plural non-illustrated image capture sections respectively provided at a front section, rear section, and sides of the vehicle 12, a non-illustrated control section connected to the respective image capture sections, and a non-illustrated display section connected to the control section. As an example, the PVM 28 displays on the display section an omnidirectional image combining image information acquired by the plural image capture sections and centered on the vehicle 12.

The acceleration sensor 30 is a sensor that detects information relating to a state of the vehicle 12 by detecting acceleration of the vehicle 12.

The first brake unit 32 is a device that causes the vehicle 12 to brake by braking non-illustrated wheels of the vehicle 12. Note that the first brake unit 32 is provided with non-illustrated wheel speed sensors.

The first electric power steering unit 34 is a device that steers the vehicle 12, and performs steering assist and actual steering by actuating a non-illustrated steering gearbox.

The MID 36 is a device that presents information to an occupant by displaying various information on a non-illustrated display unit provided inside the vehicle cabin.

The first buzzer 38 is a device that presents information to an occupant by sounding a non-illustrated buzzer provided inside the vehicle cabin to attract the attention of the occupant.

The EPB 40 is a device that maintains a stationary state of the vehicle 12 by electrically actuating and releasing a parking brake provided in the vehicle 12.

The CGW 42 is a relay device of an onboard network, and relays communication frames through plural non-illustrated buses connected to various devices in the vehicle 12.

Autonomous Driving System

The autonomous driving system 16 is configured from plural devices. More specifically, the autonomous driving system 16 is configured including the control ECU 22, a forward LIDAR 58, a long-range camera 60, a locator camera 62, a map information storage section 64, a second brake unit 66, a second electric power steering unit 68, a tell-tale indicator 70, a second buzzer 72, a transmission unit 74, an Ethernet switch (hereafter "ESW") 76, a rearward LIDAR 78 serving as both a vehicle side LIDAR and a vehicle rearward LIDAR, and a drive monitoring camera (hereafter "DMC") 80 serving as an occupant monitoring device.

The ROM 46 or the storage 50 of the control ECU 22 holds an autonomous driving program for autonomously driving the vehicle 12.

The forward LIDAR 58 is a sensor that detects peripheral information relating to the peripheral environment around the vehicle 12 by using an infrared laser beam to scan a predetermined range centered on a front side of the vehicle to detect obstacles and the like in the vehicle periphery.

The long-range camera 60 is a sensor that detects peripheral information relating to the peripheral environment around the vehicle 12 by capturing an external situation around the vehicle 12 to acquire image information and thus detect the peripheral information. Note that the long-range camera 60 detects different peripheral information to the stereo camera 26 described above.

The locator camera 62 is a sensor that detects peripheral information relating to the peripheral environment around the vehicle 12 by capturing an external situation around the vehicle 12 to acquire image information, and detects the peripheral information by comparing the acquired image information against map information recorded in advance in the map information storage section 64, described below. Note that the locator camera 62 detects different peripheral information to the stereo camera 26 and the long-range camera 60 described above.

The map information storage section 64 is a device that detects information relating to a state of the vehicle 12 by detecting position information and movement information for the vehicle 12 with respect to pre-recorded map information.

The second brake unit 66 is a device that causes the vehicle 12 to brake by braking the non-illustrated wheels of the vehicle 12, similarly to the first brake unit 32. Note that the first brake unit 32 and the second brake unit 66 are provided within a single case.

The second electric power steering unit 68 is a device that steers the vehicle 12, and performs steering assist and actual steering by actuating a non-illustrated steering gearbox, similarly to the first electric power steering unit 34. The first electric power steering unit 34 and the second electric power steering unit 68 are provided within a single case.

The tell-tale indicator 70 is a device that presents information to an occupant, for example by displaying various information on a non-illustrated meter panel provided inside the vehicle cabin.

The second buzzer 72 is a device that presents information to an occupant by sounding a non-illustrated buzzer provided inside the vehicle cabin to attract the attention of the occupant, similarly to the first buzzer 38.

The transmission unit 74 is a device that controls driving of the vehicle and is able to change shift positions using fly-by-wire technology.

The ESW 76 is a relay device of an onboard network, and relays communication frames to plural non-illustrated Ethernet networks connected to various devices in the vehicle 12.

The rearward LIDAR 78 is a sensor that detects peripheral information relating to the peripheral environment around the vehicle 12 by using an infrared laser beam to scan a predetermined range centered on a rear side and sides of the vehicle to detect obstacles and the like in the vehicle periphery.

The DMC 80 is a sensor that monitors states of an occupant inside the vehicle, and is provided at an upper section of a non-illustrated instrument panel of the vehicle 12 so as to acquire image information by capturing the face of the occupant.

Main Power Source Device

The main power source device 18 includes a main battery 84 and a first converter 86. The main battery 84 is, for example, a power supply source for a drive mechanism and certain devices (described in detail later) of the vehicle 12.

The first converter 86 is electrically connected to the main battery 84, and steps down the voltage of a current from the main battery 84 before supplying this current to the respective devices.

Auxiliary Power Source Device

The auxiliary power source device 20 includes a sub battery 88 and an integrated control converter 90. The sub battery 88 is a power supply source for certain devices (described in detail later) of the vehicle 12. Note that the power capacity of the sub battery 88 is set smaller than the power capacity of the main battery 84.

Figure 4:
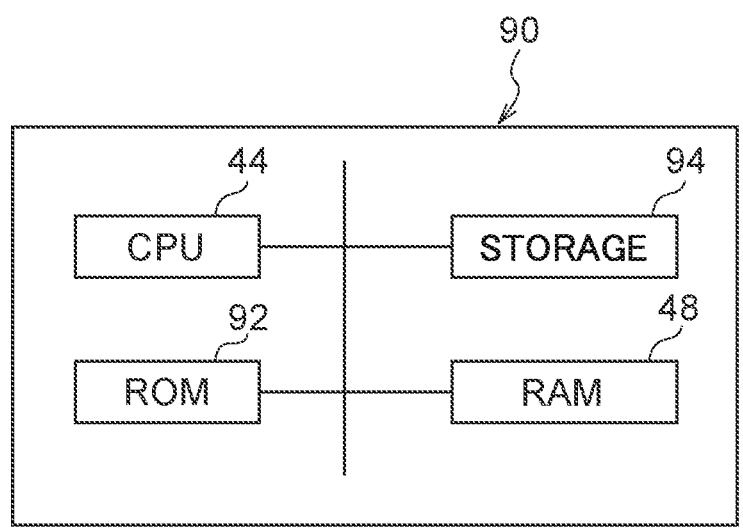
FIG. 4 is a block diagram illustrating a hardware configuration of an integrated control converter in a vehicle control system according to an exemplary embodiment.

As illustrated in FIG. 2, the integrated control converter 90 is electrically connected to the sub battery 88 and the main power source device 18. The integrated control converter 90 is configured including an internal CPU 44, ROM 92, RAM 48, and storage 94 as illustrated in FIG. 4, as well as a rectifier circuit 96 and a cut-off device 98. These configurations are connected together through a bus 54 so as to be capable of communicating with each other.

The CPU 44 serves as a processor that controls the respective configurations described above and performs various computation processing according to a program recorded in the ROM 92, serving as memory, or the storage 94, likewise serving as memory. In the present exemplary embodiment, an emergency power control program that controls power supply when an abnormality has arisen in the main power source device 18 or the auxiliary power source device 20 is held in the ROM 92 or the storage 94.

The ROM 92 holds various programs and various data. The RANI 48 serves as a workspace to temporarily store programs and data. The storage 94 is configured by a HDD or a SSD, and holds various programs including an operating system, as well as various data.

The rectifier circuit 96 steps down the voltage of the current from the sub battery. The cut-off device 98 is capable of disconnecting the electrical connection between the main power source device 18 and the integrated control converter 90, and thus the auxiliary power source device 20.

Functional Configuration

The vehicle control system 10 implements various functionality using the above hardware resources when the driving assistance program, the autonomous driving program, and the emergency power control program mentioned above are executed. Explanation follows regarding functional configuration implemented by the vehicle control system 10.

Figure 5:
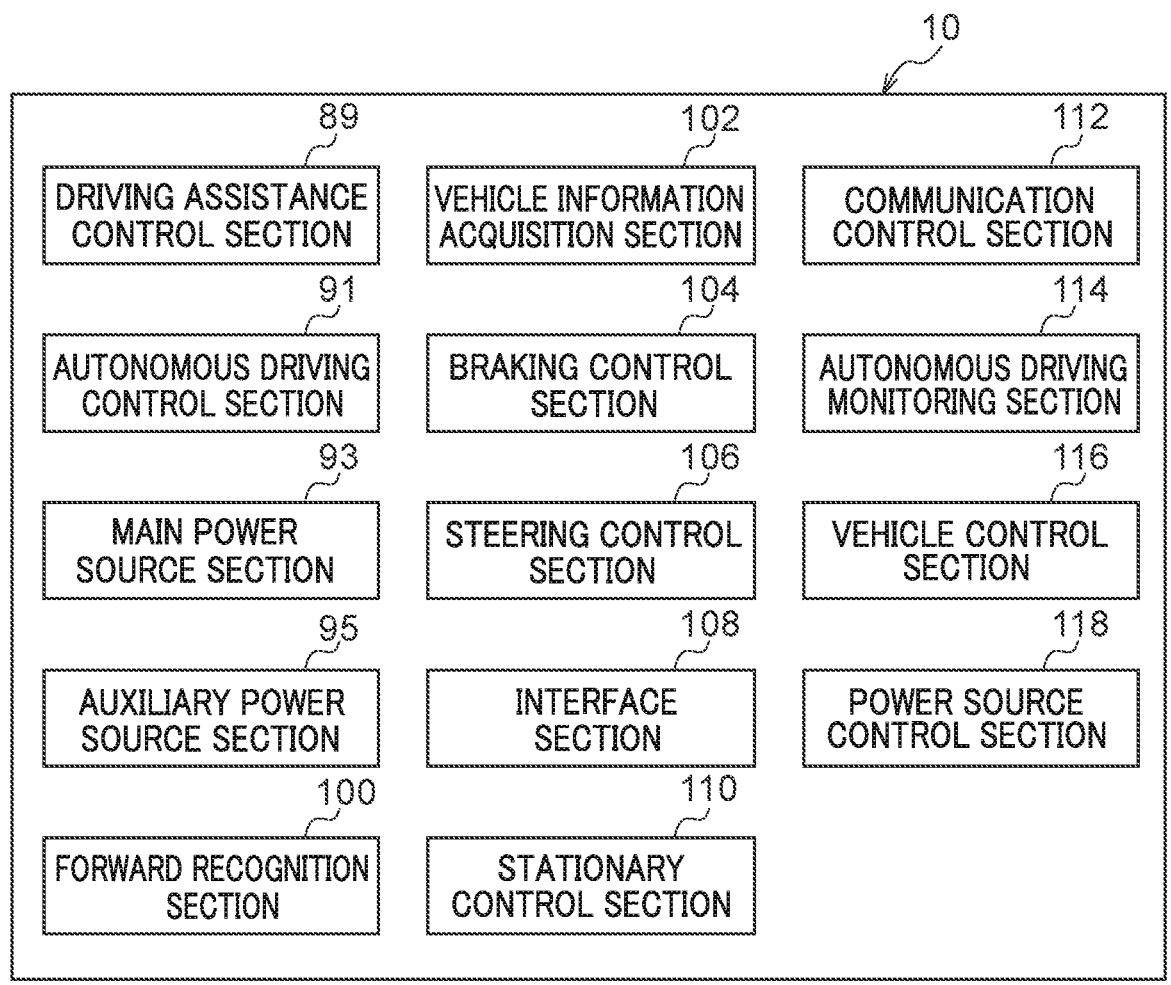
FIG. 5 is a block diagram illustrating functional configuration of a vehicle control system according to an exemplary embodiment.

FIG. 5 is a block diagram illustrating functional configuration of the vehicle control system 10.

As illustrated in FIG. 5, the functional configuration of the vehicle control system 10 includes a driving assistance control section 89, an autonomous driving control section 91, a main power source section 93, an auxiliary power source section 95, a vehicle control section 116, and a power source control section 118, as well as a forward recognition section 100, a vehicle information acquisition section 102, a braking control section 104, a steering control section 106, an interface section 108, a stationary control section 110, a communication control section 112, and an autonomous driving monitoring section 114 configuring plural functional sections. The respective functional configuration is implemented by the CPU 44 of the control ECU 22 reading and executing the driving assistance program, the autonomous driving program, and the emergency power control program stored in the ROM 46 or the storage 50 (see FIG. 2).

The driving assistance control section 89 acquires information from ahead of the vehicle 12 or relating to the travel path during manual driving by an occupant, and based on this information, determines whether or not there is a possibility of the vehicle 12 colliding with an obstacle or the like. In cases in which there is a possibility of a collision, the occupant is warned and a collision avoidance operation is performed if required by controlling at least one of steering or braking.

The autonomous driving control section 91 acquires peripheral information for the vehicle 12, as well as position information, travel route information, and the like for the vehicle 12, and performs autonomous driving by controlling drive, steering, and braking.

The main power source section 93 uses the main power source device 18 to supply power to first devices, configured by the control ECU 22, the millimeter-wave radar 24, the stereo camera 26, the PVM 28, the acceleration sensor 30, the first brake unit 32, the first electric power steering unit 34, the MID 36, the first buzzer 38, the EPB 40, and the CGW 42 (these devices are hereafter sometimes referred to collectively as the "first devices"). The main power source section 93 also uses the main power source device 18 to supply power to third devices, configured by the rearward LIDAR 78 and the DMC 80 (these devices are hereafter sometimes referred to collectively as the "third devices").

The auxiliary power source section 95 uses the auxiliary power source device 20 to supply power to second devices configured by the control ECU 22, the forward LIDAR 58, the long-range camera 60, the locator camera 62, the map information storage section 64, the second brake unit 66, the second electric power steering unit 68, the tell-tale indicator 70, the second buzzer 72, the transmission unit 74, and the ESW 76 (these devices are hereafter sometimes referred to collectively as the "second devices").

The forward recognition section 100 is configured by plural devices with functionality to detect peripheral information relating to the peripheral environment around the vehicle 12. Namely, the millimeter-wave radar 24, the stereo camera 26, the PVM 28, the forward LIDAR 58, the long-range camera 60, the locator camera 62, and the map information storage section 64 detect forward information from ahead of the vehicle 12 that relates to the state of the travel path. Note that first devices configuring the forward recognition section 100 are the millimeter-wave radar 24, the stereo camera 26, and the PVM 28. Second devices configuring the forward recognition section 100 are the forward LIDAR 58, the long-range camera 60, the locator camera 62, and the map information storage section 64.

The vehicle information acquisition section 102 is configured by plural devices with functionality to detect peripheral information relating to states of the vehicle 12. Namely, the acceleration sensor 30, the map information storage section 64, and the first brake unit 32 detect information relating to states of the vehicle 12. Note that first devices configuring the vehicle information acquisition section 102 are the acceleration sensor 30 and the first brake unit 32. A second device configuring the vehicle information acquisition section 102 is the map information storage section 64.

The braking control section 104 is configured by plural devices with functionality to perform braking of the vehicle 12. Namely, the first brake unit 32 and the second brake unit 66 control braking of the vehicle 12. Note that a first device configuring the braking control section 104 is the first brake unit 32. A second device configuring the braking control section 104 is the second brake unit 66.

The steering control section 106 is configured by plural devices with functionality to perform steering of the vehicle 12. Namely, the first electric power steering unit 34 and the second electric power steering unit 68 control steering of the vehicle 12. Note that a first device configuring the steering control section 106 is the first electric power steering unit 34. A second device configuring the steering control section 106 is the second electric power steering unit 68.

The interface section 108 is configured by plural devices with functionality to present information to an occupant. Namely, the MID 36, the first buzzer 38, the tell-tale indicator 70, and the second buzzer 72 present information to an occupant of the vehicle 12. Note that first devices configuring the interface section 108 are the MID 36 and the first buzzer 38. Second devices configuring the interface section 108 are the tell-tale indicator 70 and the second buzzer 72.

The stationary control section 110 is configured by plural devices capable of maintaining a stationary state of the vehicle 12. Namely, the EPB 40 and the transmission unit 74 perform control to maintain a stationary state of the vehicle 12. Note that a first device configuring the stationary control section 110 is the EPB 40. A second device configuring the stationary control section 110 is the transmission unit 74.

The communication control section 112 is configured by plural devices with onboard network relay functionality. Namely, the CGW 42 and the ESW 76 control communication over the onboard network. Note that a first device configuring the communication control section 112 is the CGW 42. A second device configuring the communication control section 112 is the ESW 76.

The autonomous driving monitoring section 114 is configured by plural devices that are only used during execution of autonomous driving. Namely, the rearward LIDAR 78 and the DMC 80 acquire information required during autonomous driving by the autonomous driving system 16. Note that the autonomous driving monitoring section 114 is configured by the rearward LIDAR 78 and the DMC 80, these being third devices.

The vehicle control section 116 uses the control ECU 22 to control drive, steering, braking, and the like of the vehicle 12 during driving assistance and autonomous driving. The control ECU 22 configuring the vehicle control section 116 is electrically connected to both the main power source device 18 and the auxiliary power source device 20.

The power source control section 118 supplies power to the plural first devices, second devices, and third devices previously described from the main power source device 18 and the auxiliary power source device 20. Moreover, when an abnormality has arisen in either one of the main power source device 18 or the auxiliary power source device 20, for example due to a ground fault, the power source control section 118 releases the electrical connection on the side where the abnormality has arisen.

Processing Flow

Next, explanation follows regarding operation of the vehicle control system 10. FIG. 6 is a flowchart illustrating a flow of operation of the vehicle control system 10. The CPU 44 reads the driving assistance program, autonomous driving program, and emergency power control program respectively saved in the ROMs 46, 92 or the storages 50, 94 and expands and executes the programs in the RAM 48 in order to perform various control of the vehicle 12.

The CPU 44 determines whether or not an abnormality has arisen in either the main power source device 18 or the auxiliary power source device 20 (step S100). In cases in which an abnormality has arisen in either the main power source device 18 or the auxiliary power source device 20 (step S100: YES), the CPU 44 releases the connection with the power source device on the side where the abnormality has arisen (step S102). On the other hand, in cases in which no abnormality has arisen in either the main power source device 18 or the auxiliary power source device 20 (step S100: NO), the CPU 44 determines whether or not an abnormality has arisen in any of the plural devices configuring the autonomous driving system 16 and the driving assistance system 14 (step S104). In cases in which no abnormality has arisen in any of the devices (step S104: NO), the CPU 44 transitions to the processing of step S108, described below. In cases in which an abnormality has arisen in a device (step S104: YES), the CPU 44 switches to using another device within the same functional section as the device in which an abnormality has arisen (step S106).

The CPU 44 then determines whether or not an occupant wishes to execute autonomous driving (switch to an autonomous driving mode) (step S108). In cases in which the occupant does not wish to switch to the autonomous driving mode (step S108: NO), the CPU 44 determines whether or not it is possible to execute driving assistance, in consideration of the states of the first devices, the second devices, the main power source device 18, and the auxiliary power source device 20 (step S114). In cases in which execution of driving assistance is possible (step S114: YES), the CPU 44 executes driving assistance (step S116), after which processing returns to step S100.

In cases in which an abnormality has arisen in at least one of the first devices, the second devices, the main power source device 18, or the auxiliary power source device 20, and therefore execution of driving assistance is not possible (step S114: NO), the CPU 44 permits manual driving only (step S117), after which processing based on the driving assistance program, the autonomous driving program, and the emergency power control program is ended.

On the other hand, in cases in which the occupant wishes to switch to the autonomous driving mode (step S108: YES), the CPU 44 determines whether or not it is possible to switch to the autonomous driving mode, in consideration of the states of the first devices, the second devices, the third devices, the main power source device 18, and the auxiliary power source device 20 (step S110). In cases in which execution of autonomous driving is possible (step S110: YES), the CPU 44 executes autonomous driving (step S112), after which processing returns to step S100.

In cases in which execution of autonomous driving is not possible due to an abnormality in at least one of the first devices, the second devices, the third devices, the main power source device 18, or the auxiliary power source device 20 (step S110: NO), the CPU 44 determines whether or not execution of driving assistance is possible (step S118). In cases in which execution of driving assistance is possible (step S118: YES), the CPU 44 actuates whichever out of the first buzzer 38 or the second buzzer 72 is operable (step S126) to inform the occupant, and also switches to execution of driving assistance (step S128). The CPU 44 then determines whether or not the switch to driving assistance has been completed, based on detection of occupant operation and the like (step S130). In cases in which the switch to execution of driving assistance has not been completed (step S130: NO), the CPU 44 returns to the processing of step S126. On the other hand, in cases in which the switch to execution of driving assistance has been completed (step S130: YES), the CPU 44 ends the processing based on the driving assistance program, the autonomous driving program, and the emergency power control program.

On the other hand, in cases in which execution of driving assistance is not possible (step S118: NO), the CPU 44 actuates whichever out of the first buzzer 38 or the second buzzer 72 is operable (step S120) to inform the occupant, and also switches to manual driving (step S122). The CPU 44 then determines whether or not the switch to execution of manual driving has been completed, based on detection of occupant operation and the like (step S124). In cases in which the switch to execution of manual driving has not been completed (step S124: NO), the CPU 44 returns to the processing of step S120. On the other hand, in cases in which the switch to execution of manual driving has been completed (step S124: YES), the CPU 44 ends the processing based on the driving assistance program, the autonomous driving program, and the emergency power control program.

Next, explanation follows regarding operation and advantageous effects of the present exemplary embodiment.

As illustrated in FIG. 2 and FIG. 5, in the present exemplary embodiment, the vehicle control system 10 includes the driving assistance control section 89, the autonomous driving control section 91, the first devices, the second devices, and the functional sections. The driving assistance control section 89 performs driving assistance including at least braking control of the vehicle 12. The autonomous driving control section 91 controls so as to perform autonomous driving of the vehicle 12. The first devices are used at least during execution of driving assistance of the vehicle 12. The second devices are used at least during execution of autonomous driving of the vehicle 12. The functional sections are configured by the first devices and the second devices having equivalent functionality to each other, and are connected in a communicable manner to the driving assistance control section 89 and the autonomous driving control section 91. Note that as an example of a first device and a second device having equivalent functionality to each other, the stereo camera 26 is a first device that has vehicle forward monitoring functionality and is used during execution of driving assistance, while the forward LIDAR 58 is a second device that has vehicle forward monitoring functionality, this being equivalent functionality to the stereo camera 26, and is used during execution of autonomous driving. In cases in which an abnormality has arisen in either one of a first device or a second device configuring a functional section, the other device out of the first device or the second device configuring the same functional section can be used. This enables autonomous driving or driving assistance of the vehicle to be performed without providing a redundant structure for each of the devices that perform autonomous driving and each of the devices that perform driving assistance. This enables an increase in the number of components in redundant structures to be suppressed.

Moreover, the first devices are connected in a communicable manner to the driving assistance control section 89. The second devices are connected in a communicable manner to the autonomous driving control section 91. The first devices are further connected in a communicable manner to the autonomous driving control section 91. Accordingly, during autonomous driving of the vehicle 12, the autonomous driving control section 91 communicates not only with the second devices but also with the first devices used during execution of driving assistance, enabling the first devices to be used in autonomous driving. Namely, the first devices can act as backup devices for the second devices. This enables redundancy during autonomous driving to be improved.

Moreover, the second devices are connected in a communicable manner to the driving assistance control section 89. Accordingly, during driving assistance of the vehicle 12, the driving assistance control section 89 communicates not only with the first devices but also with the second devices used during execution of autonomous driving, enabling the second devices to be used in driving assistance. Namely, the second devices can act as backup devices for the first devices. This enables redundancy during driving assistance to be improved.

Moreover, when communication with the second devices is abnormal, the autonomous driving control section 91 communicates with the first devices used during execution of driving assistance, enabling the first devices to be used to control the vehicle 12. Namely, it is possible to prevent an immediate loss of control of the vehicle 12 even in cases in which an abnormality has arisen in the second devices during autonomous driving. This enables safety during autonomous driving to be improved.

The driving assistance control section 89 and the first devices use the main power source section 93 as a power supply source. The autonomous driving control section 91 and the second devices use the auxiliary power source section 95 as a power supply source. Accordingly, even in cases in which an abnormality has arisen in one of the main power source section 93 or the auxiliary power source section 95, the autonomous driving control section 91 and the second devices, or the driving assistance control section 89 and the first devices, that use the other out of the main power source section 93 or the auxiliary power source section 95 as a power supply source can be used to control the vehicle 12. This enables redundancy during autonomous driving and during driving assistance to be improved.

Moreover, since the main power source section 93 is set with a larger power capacity than the auxiliary power source section 95, the size of the auxiliary power source section 95 can be reduced. This enables the required installation space in the vehicle 12 to be reduced in comparison to cases in which the main power source section 93 and the auxiliary power source section 95 are set with the same power capacity as each other.

Moreover, the third devices are only used during execution of autonomous driving. The third devices are connected in a communicable manner to the autonomous driving control section 91, and are also connected to the main power source section 93. Namely, since use of the third devices is not required in an emergency when autonomous driving cannot generally be performed, for example when an abnormality has arisen, there is less need to provide redundant structures for the third devices. The third devices are connected to the main power source section 93, enabling the power supplied by the auxiliary power source section 95 to be further reduced. This therefore enables a further reduction in size of the auxiliary power source section 95.

Moreover, the third devices are configured by the DMC 80 that performs occupant monitoring, and the rearward LIDAR 78 that detects peripheral information to the sides of the vehicle 12 and peripheral information rearward of the vehicle 12. Neither of these devices are required to be used in an emergency when autonomous driving cannot generally be performed, for example when an abnormality has arisen. Accordingly, connecting these devices to the main power source section 93 enables the power supplied by the auxiliary power source section 95 to be further reduced. These factors enable the degrees of freedom for design to be improved.

Note that in the exemplary embodiment described above, the driving assistance system 14 is configured to control steering and braking of the vehicle 12 according to the situation ahead of the vehicle as driving assistance during manual driving by an occupant. However, there is no limitation thereto, and the driving assistance system 14 may perform only braking control, or may perform another type of control.

Although the various programs, data, and the like are stored in the ROMs 46, 92 or the storages 50, 94 in the exemplary embodiment described above, there is no limitation thereto. For example, the various programs, data, and the like may be stored and distributed on a non-transitory recording medium such as a compact disc (CD), a digital versatile disc (DVD), or universal serial bus (USB) memory, and executed by a processor such as the CPU 44.

Although explanation has been given regarding an exemplary embodiment of the present disclosure, the present disclosure is not limited to the above description, and obviously various other modifications may be implemented within a range not departing from the spirit of the present disclosure.

What is claimed is:

1. A vehicle control system comprising:
   a memory;
   a first device configured to be used during execution of driving assistance including at least braking control of the vehicle;
   a second device configured to be used during execution of autonomous driving of the vehicle, the second device having equivalent functionality to the first device and including structural components that are different from structural components of the first device; and
   an internal central processing unit connected to the memory, communicably connected to the first device, communicably connected to the second device, and configured to:
   cause the first device to function by communication with the first device during the execution of the driving assistance of the vehicle,
   cause the second device to function by communicating with the second device during the execution of the autonomous driving of the vehicle, and
   in a case in which the internal central processing unit determines that one of the first device and the second device has a communication abnormality, execute the driving assistance or the autonomous driving by causing the other of the first device and the second device to function by communicating with the other of the first device and the second device, wherein
   the first device includes a first group of devices including a millimeter-wave radar, a stereo camera, a panoramic view monitor system, an acceleration sensor, a first brake unit, a first electric power steering unit, a multi-information display unit, a first buzzer, an electric parking brake unit, and a central gateway, and
   the second device includes a second group of devices including a forward LIDAR, a long-range camera, a locator camera, a map information storage, a second brake unit, a second electric power steering unit, a tell-tale indicator, a second buzzer, a transmission, an Ethernet switch, a rearward LIDAR, and an occupant monitoring device.

2. The vehicle control system of claim 1, wherein
   the internal central processing unit and the first device are supplied with power from a main power source section, and
   the internal central processing unit and the second device are supplied with power from an auxiliary power source section.

3. The vehicle control system of claim 2, wherein the main power source section is set with a larger power capacity than the auxiliary power source section.

4. The vehicle control system of claim 2, further comprising a third device that is connected in a communicable manner to the internal central processing unit and that is also connected to the main power source section,
   wherein the internal central processing unit only uses the third device during the execution of the autonomous driving of the vehicle.

5. The vehicle control system of claim 4, wherein the third device is at least one of:
   the occupant monitoring device configured to perform occupant monitoring,
   a side LIDAR configured to detect peripheral information at a side of the vehicle,
   the rearward LIDAR configured to detect peripheral information rearward of the vehicle.

* * * * *